(12) United States Patent
Huttner et al.

(10) Patent No.: US 10,137,516 B2
(45) Date of Patent: Nov. 27, 2018

(54) ELECTROCHEMICAL MACHINING OF A WORKPIECE

(71) Applicant: MTU Aero Engines AG, Munich (DE)

(72) Inventors: Roland Huttner, Jesenwang (DE); Heinz Dietz, Dachau (DE); Christian Doll, Ainhofen (DE); Hermann Baur, Sielenbach (DE); Rolf Kneilling, Rapperzell (DE)

(73) Assignee: MTU AERO ENGINES AG, Munich (DE)

( * ) Notice: Subject to any disclaimer, the term of this patent is extended or adjusted under 35 U.S.C. 154(b) by 530 days.

(21) Appl. No.: 14/847,615

(22) Filed: Sep. 8, 2015

(65) Prior Publication Data

US 2016/0074952 A1 Mar. 17, 2016

(30) Foreign Application Priority Data

Sep. 11, 2014 (DE) .......................... 10 2014 218 169

(51) Int. Cl.
| | |
|---|---|
| B23H 11/00 | (2006.01) |
| B23H 3/00 | (2006.01) |
| B23H 9/10 | (2006.01) |
| B23H 7/26 | (2006.01) |
| B23H 7/30 | (2006.01) |

(52) U.S. Cl.
CPC ............ *B23H 11/003* (2013.01); *B23H 3/00* (2013.01); *B23H 7/26* (2013.01); *B23H 7/30* (2013.01); *B23H 9/10* (2013.01)

(58) Field of Classification Search
CPC ............... B23H 9/10; B23H 7/26; B23H 7/30
See application file for complete search history.

(56) References Cited

U.S. PATENT DOCUMENTS

| | | | |
|---|---|---|---|
| 3,095,364 A * | 6/1963 | Faust | ...................... B23H 3/00 204/224 M |
| 3,372,099 A | 3/1968 | Clifford | |
| 4,430,544 A | 2/1984 | Inoue | |
| 4,562,391 A | 12/1985 | Inoue | |
| 5,244,548 A | 9/1993 | Bruns et al. | |
| 7,318,884 B2 | 1/2008 | Mielke | |
| 7,462,273 B2 | 12/2008 | Mielke | |
| 8,034,228 B2 | 10/2011 | Bayer et al. | |
| 2002/0165637 A1 | 11/2002 | Dillon | |
| 2004/0163950 A1 | 8/2004 | Emesh | |

(Continued)

FOREIGN PATENT DOCUMENTS

| | | |
|---|---|---|
| CN | 202289936 U | 11/2012 |
| DE | 1515195 A | 12/1971 |

(Continued)

*Primary Examiner* — Nicholas A Smith
(74) *Attorney, Agent, or Firm* — Abel Law Group, LLP

(57) ABSTRACT

The invention relates to a machine having a base (300) and at least one work station (306) that has a module (50) for electrochemically machining a workpiece (51). The module comprises: a frame (54); and an electrode arrangement, having at least one electrode (60, 160), which is mechanically connected to the frame, and a drive (56, 156) for moving this electrode, which drive is attached to the frame; a workpiece holder (310, 311) for separably attaching the workpiece; and a positioning device (312, 313) for displacing the workpiece holder and the module relative to each other.

20 Claims, 5 Drawing Sheets

(56) References Cited

U.S. PATENT DOCUMENTS

| | | | |
|---|---|---|---|
| 2005/0109634 A1* | 5/2005 | Mielke | B23H 7/26 |
| | | | 205/686 |
| 2006/0131184 A1* | 6/2006 | Mielke | B23H 3/00 |
| | | | 205/651 |
| 2006/0201823 A1 | 9/2006 | Zdeblick et al. | |
| 2006/0243601 A1 | 11/2006 | Bayer et al. | |
| 2007/0295614 A1 | 12/2007 | Arndt et al. | |
| 2012/0024717 A1 | 2/2012 | Roeblitz et al. | |
| 2013/0075370 A1* | 3/2013 | Bigelow | B23H 1/00 |
| | | | 219/69.15 |
| 2014/0069809 A1 | 3/2014 | Laun et al. | |
| 2015/0021199 A1* | 1/2015 | Huttner | G01S 17/46 |
| | | | 205/645 |

FOREIGN PATENT DOCUMENTS

| | | |
|---|---|---|
| DE | 3131056 A1 | 3/1982 |
| DE | 10258920 A1 | 7/2004 |
| DE | 10355875 A1 | 6/2005 |
| DE | 102004056158 B3 | 3/2006 |
| DE | 102006027033 A1 | 12/2007 |
| DE | 102010032701 A1 | 2/2012 |
| EP | 1707294 A2 | 10/2006 |
| JP | 2006305645 A | 11/2006 |
| WO | 2012152254 A1 | 11/2012 |

* cited by examiner

ELECTROCHEMICAL MACHINING OF A WORKPIECE

CROSS-REFERENCE TO RELATED APPLICATIONS

The present application claims priority under 35 U.S.C. § 119 of German Patent Application No. 102014218169.0, filed Sep. 11, 2014, the entire disclosure of which is expressly incorporated by reference herein.

BACKGROUND OF THE INVENTION

1. Field of the Invention

The invention relates to a machine, a module and a method for electrochemically machining a workpiece, in particular a gas turbine component.

2. Discussion of Background Information

Electrochemical machining (ECM) is a forming machining method for machining of workpieces that can be used advantageously, in particular, in the machining of complex surface shapes and/or materials that are difficult to machine. The method uses the anodic oxidation of the material to be machined, wherein a working electrode is arranged at a distance from the surface to be machined, an electrolyte is provided in the gap between the surface to be machined and the electrode and, as a result of an electric potential being applied between the electrode and the workpiece to be machined, the material of the workpiece is dissolved by anodic oxidation and goes into the electrolyte. This results in a removal of material, which is dependent on the potential relationships in the machining gap. These relationships, in turn, are influenced by the gap width, such that a three-dimensional shape of the working electrode, having correspondingly differing distances of the working electrode from the surface to be machined, results in a material removal that is dependent on shape. The shape of the working electrode can thus be imposed, or reproduced, on the machined surface.

Electrochemical removal of material can be performed not only continuously, but also in pulsed form, in which case, instead of a continuous flow of current being set, a multiplicity of current pulses are executed in succession. Such a method is also referred to as PECM ("pulsed electrochemical machining" or "precise electrochemical machining")

Typically, the working electrodes are moved back and forth in a sinusoidal rhythm. In this case, in the removal of the electrode, the speed should be selected so as to be only of such a magnitude that no cavitations are produced between the working electrode and the workpiece. Cavitations should be avoided as far as possible, since the workpiece is damaged by metal particles being separated out locally. Moreover, these metal particles then present in the gap can cause a short circuit between the tool and the workpiece.

In view of the foregoing, it would be desirable to improve the electrochemical machining of a workpiece, in particular of a gas turbine component.

SUMMARY OF THE INVENTION

The present invention provides a machine comprising a base (300) and at least one work station (306) which comprises a module (50) for electrochemically machining a workpiece (51). The module comprises:
a frame (54); and
an electrode arrangement, comprising
at least one electrode (60, 160), which is mechanically connected to the frame, and
a drive (56, 156) for moving this electrode, which drive is attached to the frame;
a workpiece holder (310, 311) for separably attaching the workpiece;
and a positioning device (312, 313) for displacing the workpiece holder and the module relative to each other.

In one aspect of the machine of the present invention, the positioning device may comprise a main body (312, 313), on which the in particular rotatably mounted workpiece holder (310, 311) and/or the in particular rotatably mounted module (50) are/is mounted so as to be linearly, in particular vertically or horizontally, displaceable. For example, the workpiece holder may comprise a chuck (310) for separably attaching the workpiece (51), which chuck is separably connected to the main body (312).

In another aspect of the machine, the positioning device may comprise a robot having at least two actuated revolute joints for displacing the workpiece holder relative to the module.

In yet another aspect of the machine, the positioning device may comprise a crane having a lifting device and/or a robot having at least two actuated revolute joints for transferring the workpiece (51) out of a further work station (305) and/or a buffer and/or into a further work station (307) and/or a further buffer of the machine.

In a still further aspect of the machine, the machine may further comprise a swivel bearing (314) for swiveling the workpiece holder (310, 311) relative to the base (300), in particular into a vertical and/or horizontal position.

In another aspect, the machine may further comprise a measuring element (308, 315) for in particular optical and/or tactile measurement of the workpiece (51), in particular attached to the workpiece holder (310, 311) and/or may further comprise an upstream further work station (301-305) for producing, in particular electrochemically or generatively, a first outer contour of the workpiece (51) that, as compared to a second outer contour of the workpiece after machining in the downstream work station (306), has a machining allowance.

The present invention further provides a module (50) for electrochemically machining a workpiece (51), in particular for a machine as set forth above (including the various aspects thereof). The module comprises:
a frame (54); and
an electrode arrangement comprising at least one electrode (60, 160), which has a first surface working region (60*a*, 160*a*) and a second surface working region (60*b*, 160*b*) and which is mechanically connected to the frame (54), and a drive (56, 156) for moving the at least one electrode, which drive is attached to the frame.

Further, the module has a first operating mode, in which voltage is applied only to the first surface working region (60*a*, 160*a*) for electrochemically machining the workpiece (51), and a second operating mode, in which voltage is additionally or alternatively applied to the second surface working region (60*b*, 160*b*) for electrochemically machining the workpiece (51).

In one aspect of the module of the present invention, the electrode (60, 160) may be mechanically connected to the frame (54) via a tool holder (58, 158), which may be mechanically connected to the frame via two swivel arms (70, 72; 170, 172) of differing lengths.

In another aspect of the module, the drive may comprise a water cooling system (401) and/or the drive may comprise an electric motor, the output shaft of which is embodied as an eccentric shaft (402), having a drive axle (14, 64, 164) and a swivel axle (16, 66, 166) that is offset parallelwise, and is rotatably mounted in at least one ceramic bearing (403, 404) and/or screw-connected (407) to a rotor (406) that is acted upon magnetically.

The present invention further provides a method for electrochemically machining a workpiece (51) with the aid of the machine of the present invention as set forth above (including the various aspects thereof). The method comprises:

separably attaching the workpiece (51) to the workpiece holder (310, 311); and displacing the workpiece holder (310, 311) and/or the module (50) relative to each other.

The present invention further provides a method for electrochemically machining a workpiece (51) with the aid of the module (50) according to the present invention as set forth above (including the various aspects thereof). The method comprises, in a first operating mode of the module, applying voltage only to the first surface working region (60*a*, 160*a*) for electrochemically machining the workpiece (51), and, in a second operating mode of the module, applying voltage additionally or alternatively to the second surface working region (60*b*, 160*b*) for electrochemically machining the workpiece (51).

One aspect, the present invention relates to a module for electrochemically machining a workpiece, the module comprising at least one tool, in particular an electrode, a frame, to which the tool is mechanically connected, and at least one drive for moving the tool relative to the frame, which drive, in one embodiment, is attached to the frame. In one embodiment, the drive is, or is rendered, mechanically connected to the tool in such a manner that the latter is movable without backlash.

The term "movable" is to be understood to include every form of motion. This includes, in particular, linear, circular, parallel and/or elliptical paths. Superimposed motions of these differing path forms are also conceivable.

The absence of backlash has the advantage that the motions of the drive are transmitted directly to the tool. The tool thus follows the motion of the drive substantially instantaneously. In particular, eccentric torque motors, spindle motor and/or piston motors may be used as a drive. In one embodiment, the motor allows a stepless feed motion, and provides for a motional oscillation of the electrodes (changes in direction of rotation per second) of preferably 10 Hz and/or at most 60 Hz.

In one embodiment, the tool is, or is rendered, attachable, in particular attached, in particular so as to be detachable, or exchangeable, or in a permanent, or stationary, manner, to a tool holder that is preferably mechanically connected to the frame and/or drive. This has the advantage that the tool can be exchanged more rapidly without in this case the necessity of demounting the drive mechanism, which then grips on, or is coupled to, the tool holder in a preferred manner.

In one embodiment, the drive has a drive axle, arranged at a distance from which there is a swivel axle, a drive arm being hinge-coupled to the swivel axle. This has the advantage that, by means of such a lever configuration, very large forces can be applied to the tool. Preferably, the drive axle and the swivel axle are parallel to each other. In this case, an eccentric shaft may be arranged on the drive axle, the second axle of the eccentric shaft representing the swivel axle. In one embodiment, in particular in the case of a drive in the form of an eccentric torque motor, the eccentric shaft is realized, in particular produced, so as to be integral with an output shaft of the drive.

In one embodiment, the drive arm is hinge-coupled to the tool and/or to the tool holder. This has the advantage of realizing a direct drive with few mechanical elements. In this case, the hinged joint between the drive arm and the tool, or tool holder, may be designed as a flexure hinged joint. In one embodiment, a flexure hinged joint may generally have groups of spring sheets, which are arranged in series or upon each other, in particular may be composed thereof.

In one embodiment, the module comprises at least one rocker, which effects the mechanical connection between the drive and the tool or between the drive and the tool holder. This has the advantage that the driving force of the drive can be reversed. A very compact design of the apparatus can thus be realized.

In one refinement, a thrust arm, which is hinge-coupled to the tool and/or to the tool holder, is hinge-coupled to the rocker. In this case, both the hinged joint between the thrust arm and the tool, or tool holder, and the hinged joint between the rocker and the thrust arm may be designed as a flexure hinged joint. In particular, the thrust arm may have, in particular may be, a thrust plate, in particular a rectangular thrust plate. The thrust plate may be composed of a plurality of thin individual plates, which are preferably arranged in series or upon each other.

In one refinement, the drive arm and/or a bearing arm, which is hinge-coupled to the frame, is hinge-coupled to the rocker. In this case, the hinged joint between the drive arm and the rocker may be designed as a flexure hinged joint. In addition or as an alternative to this, both the hinged joint between the rocker and the bearing arm, and the hinged joint between the bearing arm and the frame may be designed as a flexure hinged joint.

In one embodiment, a flexure hinged joint may generally have in particular thin groups of spring plates, which are preferably arranged in series or upon each other, in particular may be composed thereof. Equally, it may have a thick plate, in particular be composed thereof. The thickness and/or the number of plates can be used to set a desired stiffness.

In this case, the one end of the bearing arm may be arranged at one end of the rocker, and the thrust arm and the drive arm may then be arranged above the remaining part of the rocker, such that a one-sided lever is realized.

In one embodiment, the one end of the bearing arm is arranged on the rocker, between the thrust arm and the drive arm. In this case, the one arm of the rocker to which the drive arm is hinge-coupled then represents the power arm, since the motive power is present on this arm of the rocker. The other arm of the rocker to which the thrust arm is hinge-coupled then represents the load arm, since the load to be moved (tool(holder)) is then present on this other arm. In one embodiment, very high forces can be transmitted to the load arm by means of such a one-sided lever.

In one embodiment, the tool and/or tool holder is/are mechanically connected to the frame via at least one first swivel arm. This has the advantage that the tool is guided directly, or indirectly via the tool holder, on the frame.

In one refinement, a second swivel arm is arranged, in addition to the first, between the tool and the frame or between the tool holder and the frame. This offers the advantage that the tool has a more precise and reproducible guidance directly, or indirectly via the tool holder, on the frame. Moreover, if the two swivel arms are also parallel to each other and spaced apart from each other, a parallel oscillating crank can thus then be very easily realized. Such a parallel oscillating crank offers the advantage that the tool holder can only move in one plane. The tool holder can thus be positioned at the required location in a precise and reproducible manner.

In addition, both the hinged joint between the thrust arm and the tool, or tool holder, and the hinged joint between the rock and the thrust arm may be designed as a flexure hinged joint.

In one embodiment, the module comprises a second tool, a second tool holder, a second rocker and/or a second drive, in such a manner that the second tool can be moved toward the first tool and/or toward the workpiece. This offers the advantage, particularly in the case of gas turbine components such as blades, that the workpiece can be machined simultaneously from two sides. The machining time is therefore halved. Moreover, in the case of two oscillating tools (working electrodes) that simultaneously approach the workpiece from the one and the other side, the deformation of the workpiece can be minimized, i.e. the workpiece is machined synchronously from both sides. In particular, the stresses on the workpiece that are generated as a result of the electrolyte pressure on both sides cancel each other out. Asynchronous machining of the sides of the workpiece is conceivable. In one embodiment, therefore, the one side and then the other side of the workpiece are machined alternately.

Preferably, the second tool, the second rocker and the second drive are arranged, or have been arranged, on the frame so as to be mirror-symmetrical in relation to the first tool, the first rocker and the first drive.

One aspect of the present invention relates to a method for electromechanically machining a workpiece, in particular by means of a machine described here and/or a module described here. In one embodiment, in step a.), firstly, a tool is provided, then in step b.) at least one tool is moved, with at least one first velocity characteristic, toward the workpiece. Then, in step c.), the workpiece undergoes electrochemical machining. After the machining, in step d.) the tool is moved away with a second velocity characteristic.

In one embodiment, the first velocity characteristic is independent of the second velocity characteristic.

This is fulfilled if the absolute amount of the first velocity characteristic is not equal to the absolute amount of the second velocity characteristic. The first velocity characteristic may be represented, for example, by means of a function $v_1(t')$. The second velocity characteristic may be represented, for example, by means of a function $v_2(t'')$. The following then applies: $|v_1(t')| \neq |v_2(t'')|$, wherein t' represents the time period in which the tool is made to approach the workpiece, and t'' represents the time period in which the tool is removed from the workpiece.

In the case of pure sinusoidal motions of the tool, this condition is not fulfilled, since the amount of the velocity characteristic in the time period t' (left of the minimum) is equal to the amount of the velocity characteristic in the time period t'' (right of the minimum). In the minimum, the velocity is zero for a fraction of a second. The distance between the tool and the workpiece is then least at this instant. Owing to the function of the absolute amount, the velocity curve in the time period t' is mirrored to the vertical axis going through the maximum, and coincides with the velocity curve in the time period t''.

In one embodiment, the second velocity characteristic is flatter than the first velocity characteristic. This offers the advantage that, when the tool is made to approach the workpiece, travel can be effected at higher speeds than when removing the tool from the workpiece. In particular, this enables cavitations to be avoided during the removal of the tool, and the tool can still be made to approach the workpiece at very high speed. This offers the advantage that the flushing pressure can additionally be increased during the approach of the electrode.

In one embodiment, in step c.) the position of the tool remains unchanged. This has the advantage that the position of the tool during the removal of material is known, and consequently defined voltages and currents can be applied. The surface quality is thereby greatly improved. Alternatively, the gap between the tool and the workpiece remains substantially constant. This means that the tool is guided toward the workpiece in dependence on the material removal rate. This would have the advantage of maintaining constant material removal rates.

In one embodiment, in step c.) an electric potential is applied between the tool and the workpiece, with a frequency of 100 Hz to 3 kHz. This means that, in the case of 100 hertz, the electric potential is switched on and off one hundred times per second. Preferably, square-wave electric potentials are applied.

In a further advantageous design of the invention, the steps a.) to d.) are executed with a frequency (changes of direction of rotation per second) of at least 10 Hz and/or at most 60 Hz. In the case of 10 hertz, this means that the tool is moved back and forth ten times per second, so that fresh, unused electrolyte can flow into the gap between the tool and the workpiece. The material removal rate can thereby be increased significantly.

According to one aspect of the present invention, a module comprises, for the purpose of electrochemically machining a workpiece, at least one tool, in particular an electrode, a frame, to which the tool is mechanically connected, and at least one drive, which is attached to the frame, the drive being mechanically connected to the tool in such a manner that the latter can be moved without backlash.

In one embodiment, the tool is attached to a tool holder. Additionally or alternatively, the drive has a drive axle, arranged at a distance from which there is a swivel axle, a drive arm being hinge-coupled to the swivel axle. In one embodiment, the drive arm is hinge-coupled to the tool and/or to the tool holder. Additionally or alternatively, the tool comprises at least one rocker, which effects the mechanical connection between the drive and the tool or between the drive and the tool holder. In one embodiment, a thrust arm, which is hinge-coupled to the tool and/or to the tool holder, is hinge-coupled to the rocker. In one development, the drive arm and/or a bearing arm are/is hinge-coupled to the rocker. In one embodiment, the tool and/or tool holder are/is mechanically connected to the frame via at least one swivel arm. In one refinement, a second swivel arm is arranged between the tool and the frame or between the tool holder and the frame. In one embodiment, the module comprises a second tool, a second tool holder, a second rocker and/or a second drive, in such a manner that the second tool can be moved toward the first tool.

According to one aspect of the present invention, a method for electrochemically machining a workpiece, in particular by means of a module described here, comprises the steps a.) providing a workpiece,
b.) displacing at least one tool onto the workpiece, with a first velocity characteristic,
c.) electrochemically machining the workpiece,
d.) removing the tool (10; 60, 160) from the workpiece (2; 52), with a second velocity characteristic.

In one embodiment, the first velocity characteristic is independent of the second velocity characteristic. Additionally or alternatively, in one embodiment, in step c.) the position of the tool remains unchanged, or in step c.) the gap between the tool and the workpiece remains substantially constant. In one embodiment, during the electrochemical machining, a pulsed current or a pulsed voltage is applied, with a frequency of 100 Hz to 3 kHz, between the tool and the workpiece. In one embodiment, the steps a.) to d.) are effected with a frequency of up to 50 Hz.

According to one aspect of the present invention, a machine has a base, in particular solid with the surroundings, and one or more work stations for electrochemically machining a workpiece.

In one embodiment, the machine has at least one upstream work station for producing, in particular electrochemically or generatively, a first outer contour of the workpiece, and at least one downstream further work station for electrochemically producing a second outer contour of the workpiece, the first outer contour having a machining allowance, as compared with the second outer contour. In particular, a downstream work station can be provided, or set up, for electromechanical pulsed, or PECM, machining of the workpiece, and arranged in series in relation to the upstream work station(s). An upstream work station may be provided, or set up, in particular, for electrochemical continuous machining, or ECM, of the workpiece. In one embodiment, two or more work stations for ECM or PECM machining are arranged in series, in order to machine differing regions of the workpiece. Advantageously, an individual work station can thus be of a more compact design.

In one embodiment, at least one of the work stations has a module for electrochemically machining the workpiece, which module comprises a frame and an electrode arrangement, having at least one electrode, which is mechanically connected to the frame, and a drive for moving this electrode, which drive is attached to the frame.

In one embodiment, the electrode arrangement has two electrodes, which are mechanically connected to the frame, and two drives for moving these electrodes in opposite directions, which drives are attached to the frame. The module may be, in particular, a module as described above and/or in the following.

In one embodiment, the work station has a workpiece holder for separably attaching the workpiece, and a positioning device for displacing the workpiece holder and the module relative to each other. In this case, in one embodiment, the positioning device can displace the workpiece holder relative to the stationary module, the module relative to the stationary workpiece holder, or both the workpiece holder and the module, or be set up, or provided, for this purpose.

Accordingly, a method for electrochemically machining a workpiece by means of a machine described here comprises the steps:

separably attaching the workpiece to the workpiece holder; and
displacing the workpiece holder and/or the module relative to each other.

As a result of this, in one embodiment, the module can machine differing regions of the workpiece in succession and/or optionally and, accordingly, can be of a more compact design.

In one embodiment, the positioning device has a main body, on which the workpiece holder and the module are arranged. In one development, the workpiece holder is mounted on the main body so as to be rotatable about a workpiece holder rotation axis, in particular by an actuating drive. Additionally or alternatively, in one development, the module is mounted on the main body so as to be rotatable about a module rotation axis, in particular by an actuating drive, which module rotation axis, in one embodiment, is inclined against the workpiece holder rotation axis, in particular encloses an angle of between 80° and 100° with the latter. As a result of this, in one embodiment, the module can machine differing regions of the workpiece in succession and/or optionally and, accordingly, can be of a more compact design.

In one embodiment, the workpiece holder is mounted on the main body so as to be linearly, in particular vertically or horizontally, displaceable in a workpiece holder linear axis, in particular by an actuating drive. Additionally or alternatively, in one embodiment, the module is mounted on the main body so as to be linearly, in particular vertically or horizontally, displaceable in a module linear axis, in particular by an actuating drive. In one embodiment, the workpiece holder linear axis and/or module linear axis enclose/encloses an angle of between 80° and 100° with the workpiece holder rotation axis and/or module rotation axis.

As a result of this, in one embodiment, the module can precisely machine differing regions of the workpiece in succession and/or optionally, and can be of a more compact design.

In one embodiment, the workpiece holder has a chuck, in particular a zero-point attachment system, for separably attaching the workpiece, which has been, or is, separably connected to the main body. As a result, advantageously, in one embodiment, the tool can first be attached to the chuck, in particular to the latter arranged horizontally, and the latter, for its part, can then be separably attached, in particular in a rotatably and/or linearly displaceable manner, to the main body or to a workpiece holder flange that, for its part, is mounted on the main body in a rotatably and/or linearly displaceable manner. Advantageously, asymmetries caused by gravity during attachment of the workpiece can thus be reduced.

In addition or as an alternative to a tool receiver mounted in a linearly displaceable manner on the main body, the positioning device may have a robot having at least two, in particular at least six, actuated revolute joints for displacing the workpiece holder relative to the module. This enables the workpiece to be positioned in a very variable and precise manner relative to the module, for the purpose of being machined by the latter.

In addition or as an alternative to displacing the workpiece holder relative to the module in the work station, a robot may also be used, or set up or provided, to transfer, or transport, the workpiece out of an upstream further work station and/or a buffer and into the work station, in particular on the workpiece holder thereof, and/or, following the machining operation in the work station, to transfer or transport it into a further downstream work station and/or a buffer of the machine. Accordingly, in one embodiment, the machine has one or more buffers in order to intermediately store workpieces between the machining operations in differing, in particular series-connected, work stations, and thus to compensate, at least partially, differing cycle times, outages, tool changes or the like.

In addition or as an alternative to such a robot, the machine may also have an, in particular mobile or stationary crane, having a lifting device, in order to transfer, or transport, the workpiece out of an upstream further work station and/or a buffer and into the work station, in particular on the workpiece holder thereof, and/or, following the machining operation in the work station, to transfer or transport it into a further downstream work station and/or a buffer of the machine. Whereas a robot, advantageously, is particularly flexible, a crane, in one embodiment, may be more cost-effective and/or have a greater traversing range and, accordingly, service more work stations. In one embodiment, the crane can be traversed between the work station and at least one further work station and/or at least one buffer, in particular on a ceiling or frame of the machine.

In one embodiment, the machine, or work station, has a swivel bearing for swiveling the workpiece holder relative to the base, in particular into a vertical and/or horizontal position. Accordingly, in one embodiment, the workpiece holder, in particular a part of the main body described here, on which the workpiece holder or the workpiece holder flange thereof is arranged, is hinge-coupled such that it can be swiveled relative to the base, in particular into a vertical and/or horizontal position. As a result of this, the (de)mounting, or attaching, of the workpiece from or to the workpiece holder, and/or of a chuck of the workpiece holder, can be improved.

In one embodiment, the machine has a measuring means for measuring the workpiece. This enables the machining of the latter to be monitored and, in one development, advantageously, to be feedback-controlled, in particular readjusted.

In one embodiment, the measuring means is an optical measuring means that can be set up to irradiate the workpiece with visible or invisible light and/or to receive visible or invisible light radiated onto the workpiece, and which, in one development, may have a light barrier, a laser and/or a camera. In one embodiment, the measuring means is a tactile measuring means that can be set up to trace the workpiece by touch.

In one embodiment, the measuring means measures, or is provided to set up or measure, the workpiece attached to the workpiece holder of the work station. For this purpose, it may be mounted on the workpiece, in particular so as to be movable, in particular by a robot, or on a main body described here. As a result, advantageously, the measuring can be effected in situ. In another embodiment, the measuring means is located downstream from the work station, and accordingly measures, or is provided or set up to measure, the workpiece released from the workpiece holder of the work station. As a result, the work station can be of a more compact design, and/or the measuring means can be used for measuring the workpiece after a machining operation in various work stations of the machine.

According to one aspect of the present invention, a module for electrochemically machining a workpiece has a frame, and has an electrode arrangement, having at least one electrode, which has a first surface working region and a second surface working region and which is mechanically connected to the frame, and a drive for moving this electrode, which drive is attached to the frame. The module may be, in particular, a module described above and/or in the following, in particular a module for a machine described here, in particular of a machine described here.

According to one aspect, the module has a first operating mode, in which voltage is applied only to the first surface working region for the purpose of electrochemically machining the workpiece, and a second operating mode, in which voltage is (also, or only) applied to the second surface working region, in addition or as an alternative to the first surface working region, for the purpose of electrochemically machining the workpiece.

According to one aspect of the present invention, optionally, in particular consecutively, in the first operating mode of such a module, voltage is accordingly applied only to the first surface working region for the purpose of electrochemically machining the workpiece, and, in the second operating mode of the module, voltage is additionally or alternatively applied to the second surface working region for the purpose of electrochemically machining the workpiece.

The optional application of voltage to differing surface working regions of an electrode for the purpose of electrochemically machining a workpiece, in one embodiment, enables, in particular, undercuts to be machined, in particular produced, in the workpiece in a simple and/or precise manner.

In addition or as an alternative to such a first and second surface working region and mode, according to one aspect in the case of a module described above and/or in the following the electrode and the frame are mechanically connected to each other via a tool holder, which is mechanically connected to the frame via two swivel arms of differing lengths.

This, likewise, in one embodiment, makes it possible, in particular, for undercuts to be machined, in particular produced, in the workpiece in a simple and/or precise manner.

In one embodiment, the drive of a module described here has a water cooling system. Additionally or alternatively, in one embodiment, the drive of a module described here has an electric motor, the output shaft of which is realized as an eccentric shaft having a drive axle and a swivel axle that is offset parallelwise, in particular an eccentric torque motor, which is mentioned elsewhere. In one development, the eccentric shaft is rotatably mounted in one or more ceramic bearings. This makes it possible, in particular, to provide a mounting that is capable of resisting the electrolyte for electrochemical machining. Additionally or alternatively, the eccentric shaft is screw-connected to a rotor of the electric motor that is subjected to magnetic action by a stator of the electric motor. A particularly precise and/or reliable connection can be produced as a result.

Further advantageous embodiments of the invention are set forth in the dependent claims.

BRIEF DESCRIPTION OF THE DRAWINGS

Preferred exemplary embodiments of the invention are described in greater detail in the following. There are shown in.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1A:
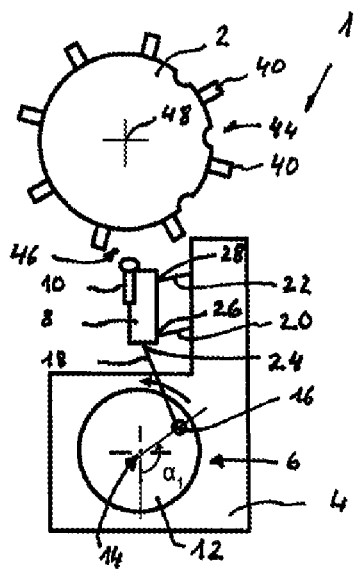
FIGS. 1A, B: a module according to one embodiment of the present invention.
Figure 1B:
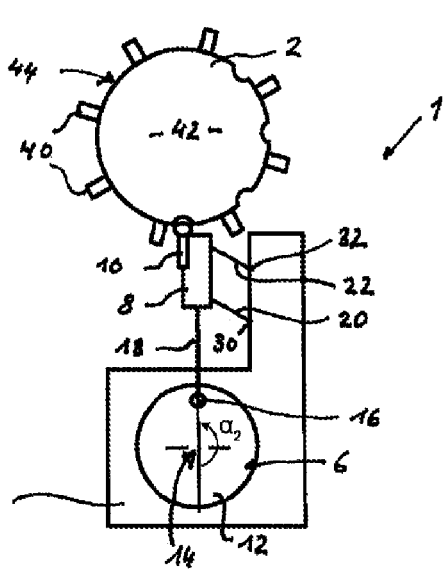

Illustrated in FIG. 1A and FIG. 1B is an ECM module 1, according to a first embodiment of the present invention, which machines a workpiece 2. The ECM module 1 comprises a frame 4, a drive 6 that is attached to the frame 4, and a tool holder 8, attached to which there is a tool 10. The drive 6 comprises a disk 12, which is attached to a drive axle 14 and which has a swivel axle 16. This disk 12 may also be merely a rod that is attached to the drive axle 14 and correspondingly comprises the swivel axle 16. Other forms are conceivable. One end of a drive arm 18 is mounted on this swivel axle 16. The other end of the drive arm 18 is hinge-coupled to one end of the tool holder 8. The tool holder 8 is attached laterally to the frame 4 via two swivel arms 20 and 22. The two swivel arms 20 and 22 form a so-called parallel oscillating crank. The tool 10 (in this case an electrode) is attached to the other end of the tool holder 8, at the top.

Preferably, the first hinged joint 24, between the tool holder 8 and the drive arm 18, is designed as a flexure hinged joint. Preferably, the second hinged joint 26, between the first swivel arm 20 and the tool holder 8, is designed as a flexure hinged joint. Preferably, the third hinged joint 28, between the second swivel arm 22 and the tool holder 8, is designed as a flexure hinged joint. Preferably, the fourth hinged joint 30, between the first swivel arm 20 and the frame 4, is designed as a flexure hinged joint. Preferably, the fifth hinged joint 32, between the second swivel arm 22 and the frame 4, is designed as a flexure hinged joint.

In FIG. 1A and FIG. 1B, preferably the tranches (annulus) of blisks are produced. A tranche is to be understood to mean the machining of the blade interspaces. FIG. 1A and FIG. 1B differ only in that the distance between the electrode 10 and the workpiece 2 is greatest in FIG. 1A, and the distance between the electrode 10 and the workpiece 2 is least in FIG. 1B.

The principle of operation of the module 1 is described in the following. The workpiece 2 (in this case, a so-called blisk) is arranged above the module 1. The blisk 2 comprises a plurality of blades 40, which are formed onto a blade disk 42. This may also be a ring. Arranged between the blades 40 there are blade interspaces 44. In FIG. 1A, three blade interspaces 44 and the circumferential surface of the blade disk 42 have already been electrochemically machined. The following now describes how the fourth blade interspace 46 is machined by means of the module. For this purpose, as a preliminary, the blade disk 42 is rotated anticlockwise about the rotation axis 48 until the fourth blade interspace 46 is arranged exactly above the electrode 10. Here, a vertical arrangement is illustrated, but any arrangement may also be adopted. This also preferably includes a horizontal arrangement. After the interspace 44 has been positioned above the electrode 10, the drive 6 is switched on. Before the drive 6 is put into operation, the angle $\alpha_1$ between the swivel axle 16 and the six-o'clock position of the disk 12 in FIG. 1A is approximately 125°. The drive 6 rotates the disk 12 anticlockwise until the angle $\alpha$ is approximately 180°. When the disk 12 is in this angular position, the maximum power can be transmitted from the drive to the tool 10. In order to realize small distances and to achieve high machining frequencies, the angular difference is maximally 20°, i.e. the angle $\alpha$ is typically between 150° and 170°. As the disk 12 is rotated, the drive arm 18 is pressed against the tool holder 8, which, for its part, is pressed upward in an elliptical path, such that the electrode 10 works, at a certain distance, into the envelope surface of the blade disk 42, as shown in FIG. 1B. At the same time, electrolyte is supplied continuously (not represented here). This may be effected via the electrode itself or via an additional supply. During the machining of the envelope surface, a voltage is applied between the blade disk 42 and the electrode 10. During the removal of material, the drive 6 can be switched off, such that the electrode 10 is in a defined fixed position. Alternatively, the drive 6 can continue to rotate during the removal of material, the drive 6 being able to rotate both counter-clockwise and clockwise. The electrode 10 is thus removed from the blade disk 42. Fresh electrolyte can be supplied, and the electrode 10 is again applied to the disk 42. This procedure is repeated until the corresponding specified dimension has been worked out in the envelope surface of the blade disk 42. The electrode 10 is then moved back, and the blade disk is rotated further about the rotation axis 48. The blade interspaces 44 that have not yet been machined can then be machined in succession.

Figure 2:
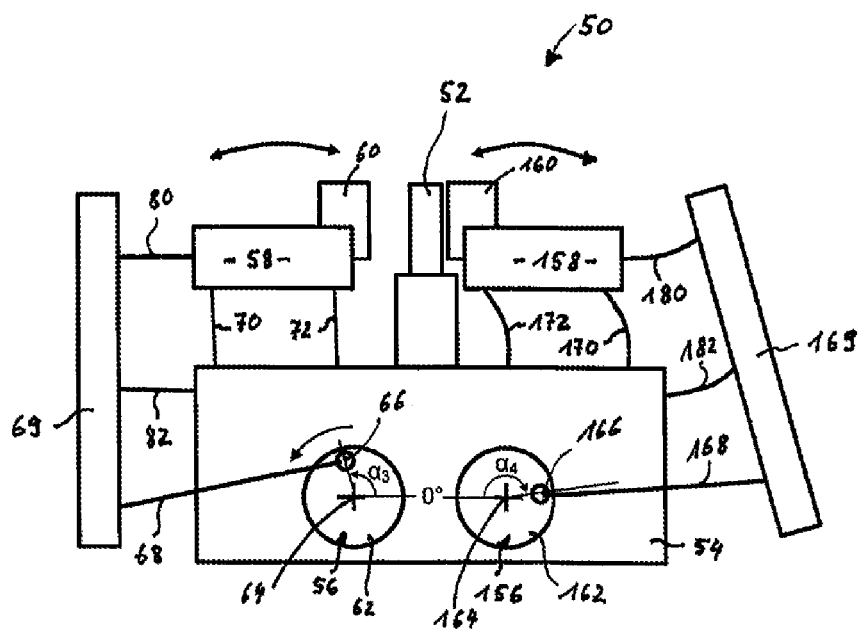
FIG. 2: a module according to a further embodiment of the present invention.

Represented in FIG. 2 is an embodiment of an ECM module 50 according to a further embodiment of the present invention, which machines a blade 52 from two sides. This may be effected simultaneously or in a time-staggered manner, as is illustrated in FIG. 2. The apparatus 50 is mirror-symmetrical in its structure, the mirror plane extending vertically through the blade 52.

The left side of the ECM module 50 comprises a frame 54, a first drive 56, which is attached to the frame 54, and a first tool holder 58, attached to which there is a first tool 60. The first drive 56 comprises a first disk 62, which is attached to a first drive axle 64 and has a first swivel axle 66. The first disk 62 may also be merely a rod, which is attached to the first drive axle 64 and correspondingly comprises the first swivel axle 66. One end of a first drive arm 68 is mounted on this swivel axle 66. The other end of the first drive arm 68 is hinge-coupled to one end of a first rocker 69. The first tool holder 58 is attached, at the bottom, to the frame 54 via a first and a first second swivel arm 70 and 72. The two swivel arms 70 and 72 form a so-called parallel oscillating crank. On the right, the first tool 60 (in this case, an electrode) is attached to one end of the first tool holder 58. The first electrode 60 may have, for example, the complementary shape of the suction side of the blade 52. Hinge-coupled to the other end of the rocker 69, at the top, there is a first thrust arm 80, which is hinge-coupled to the left end of the first tool holder 58. Between the first thrust arm 80 and the first drive arm 68, the first end of a first bearing arm 82 is hinge-coupled to the rocker 69, the second end of the first bearing arm 82 being hinge-coupled to the frame 54. Each individual hinge coupling may be designed as a flexure hinged joint.

The right side of the ECM module 50 comprises the frame 54, a second drive 156, which is attached to the frame 54, and a second tool holder 158, attached to which there is a second tool 160. The second drive 156 comprises a second disk 162, which is attached to a second drive axle 164 and has a second swivel axle 166. The second disk 162 may also be merely a rod, which is attached to the second drive axle 164 and correspondingly comprises the second swivel axle 166. One end of a second drive arm 168 is mounted on this swivel axle 166. The other end of the second drive arm 168 is hinge-coupled to one end of a second rocker 169. The second tool holder 158 is attached, at the bottom, to the frame 54 via a second first and a second swivel arm 170 and 172. The two second swivel arms 170 and 172 form a so-called parallel oscillating crank. On the left, the second tool 160 (in this case, an electrode) is attached to one end of the second tool holder 158. The second electrode 160 may have, for example, the complementary shape of the pressure side of the blade 52. Hinge-coupled to the other end of the second rocker 169, at the top, there is a second thrust arm 180, which is hinge-coupled to the right end of the second tool holder 158. Between the second thrust arm 180 and the second drive arm 168, the first end of a second bearing arm 182 is hinge-coupled to the second rocker 169, the second end of the second bearing arm 182 being hinge-coupled to the frame 54. Each individual hinge coupling may be designed as a flexure hinged joint.

On the left side of the module 50, the gap is greatest between the first tool 60 and the blade 52, whereas, on the right side of the module 50, the gap is least between the second tool 160 and the blade 52. The module may be operated asynchronously, as illustrated in FIG. 2. Preferably, however, the module is operated synchronously, such that the first tool 60 is moved toward, or away from, the blade 52 at the same time as the second tool 160.

Figure 3:
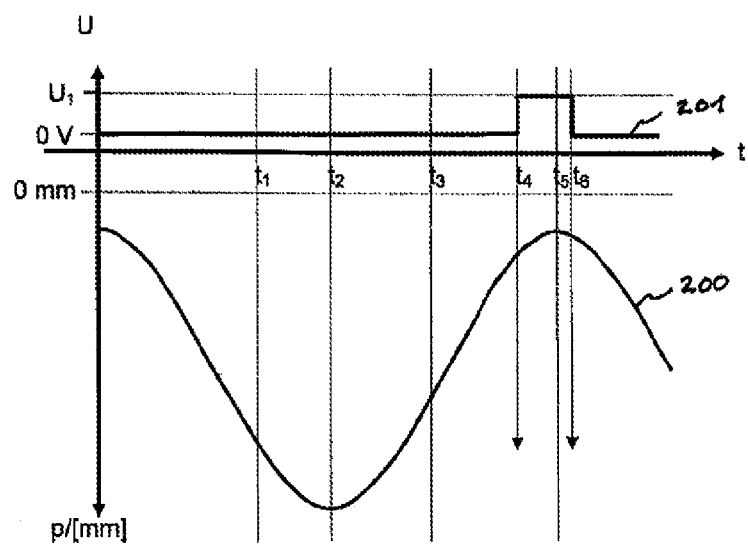
FIG. 3: a motion sequence of a tool as a function of time.
Figure 4:
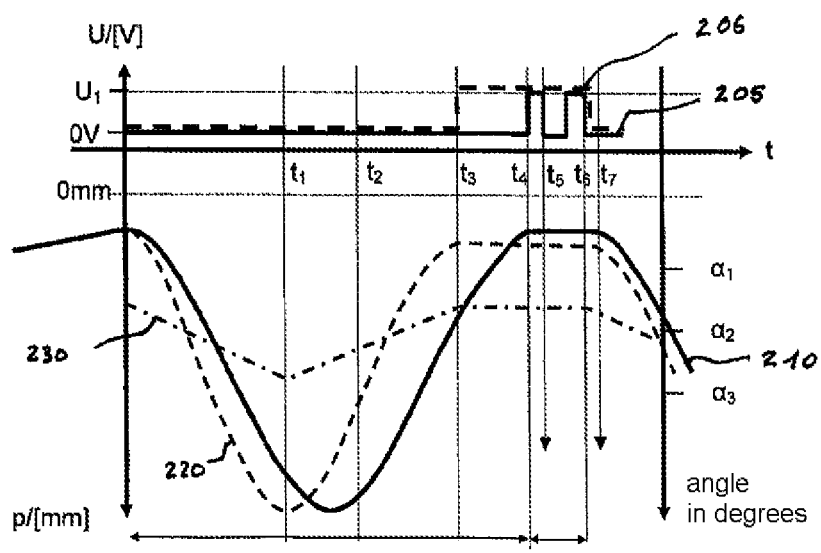
FIG. 4: a motion sequence of a tool as a function of time, according to one embodiment of the present invention.

Represented in FIG. 3 and FIG. 4 are graphs that show how the module 1 or 50 is operated according to one embodiment of the invention.

In FIG. 3, in the first quadrant, the applied voltage is represented, as a function of time, as a solid-line curve 201. Represented underneath, in the fourth quadrant, is the position of the electrode, as a function of time. If, for example, the left (first) disk 62 is rotated anticlockwise at a constant angular velocity, the position characteristic 200 of the first electrode 60 is sinusoidal. The removal of the material from the workpiece 52 occurs in the period between $t_4$ and $t_5$, since during this period a voltage is applied between the first electrode 60 and the blade 52 (workpiece). It can be seen in this case that the position of the electrode 60 changes continuously during the material removal period $t_{4,5}$ (approximately 3 ms).

In FIG. 4, in the first quadrant, a plurality of applied voltages are represented, as a function of time, as a solid-line curve 205 and as a broken-line curve 206. Represented underneath, in the fourth quadrant, are the positions of the electrode, as a function of time. These positions are represented by the solid-line curve 210 and the broken-line curve 220. Additionally represented, as a dot-dash line 230, is the angle α of the disk of a drive. In the module 50 from FIG. 2, the angle $α_3$, for example on the first disk 62, is formed between the three-o'clock position and the actual position of the first swivel axle 66. On the left side of the module, the angle $α_4$, on the second disk 162, is formed between the nine-o'clock position and the actual position of the second swivel axle 166.

The broken-line curve 220 and the dot-dash curve 230 belong together. The principle of operation is to be explained in greater detail, based on the second disk 162. The second drive 156 rotates the disk 162 anticlockwise from the instant 0 (angle $α_3$=164°) to the instant $t_1$ (angle $α_3$=152°). During this, the second drive arm 168 is displaced to the left, such that the second rocker 169 bends, or rotates, to the second bearing arm 182. As a result of this, the upper end of the second rocker 169 swivels to the right. Consequently, the second tool holder 158, together with the second electrode 160, is removed from the blade 52. As a result, fresh electrolyte can flow in through the larger gap between the electrode 160 and the blade 52. From the instant $t_1$, with an angle $α_3$ of 152°, the polarity of the second drive 156 is reversed, such that the latter now rotates clockwise, up to an angle of 164°. This angle is attained at the instant $t_3$. The second electrode therefore has the least distance from the blade 52. From the instant $t_3$ to the instant $t_6$ the second electrode does not alter in its position, since the second drive has been switched off. In this interval, for example, a square-wave voltage 206 may be applied. From the instant $t_6$, the drive is switched on again, such that the second electrode 160 is removed from the blade 52. The drive provides a different velocity for approach than for removal. The velocity of approach to the blade can be greater than the velocity of removal from the blade 52, since no cavitations can be produced during the approach.

In contrast to FIG. 3, the second drive 156 swivels back and forth between one angle and another angle. In this case, the one angle is 152° and the other angle is 164°. Other values are conceivable. However, it has been found, advantageously, that the angular difference should not be more than 20°. In this exemplary embodiment, it is specifically 12°. As a result, the second electrode 160 is moved by a maximum of 500 μm.

The solid-line curves in the first quadrant 205 and fourth quadrant 210 belong together. Unlike the broken-line curves, pulsed voltages 205 are also conceivable. It is only in the instant $t_4$ that the second electrode 160 attains the least distance. Owing to the pulsing, the second electrode 160 can be moved back again in a shorter interval of time ($t_7-t_4<t_6-t_3$), since higher material removal rates can be achieved as a result. In this example, flushing is effected in the interval $t_0$ to $t_4$, and in the interval $t_4$ to $t_7$ material is removed from the workpiece (e.g. blade).

A module, or method, described here may be used, in particular, in tranche production for blisks (or also bling=bladed ring), particularly as a final machining step. Tranche production is understood to mean the machining of blade interspaces. Blisk stands for "blade integrated disk", i.e. the blades are formed directly on the disk. The module is easily scalable, i.e. it can be easily designed for a variety of dimensions.

Figure 5:
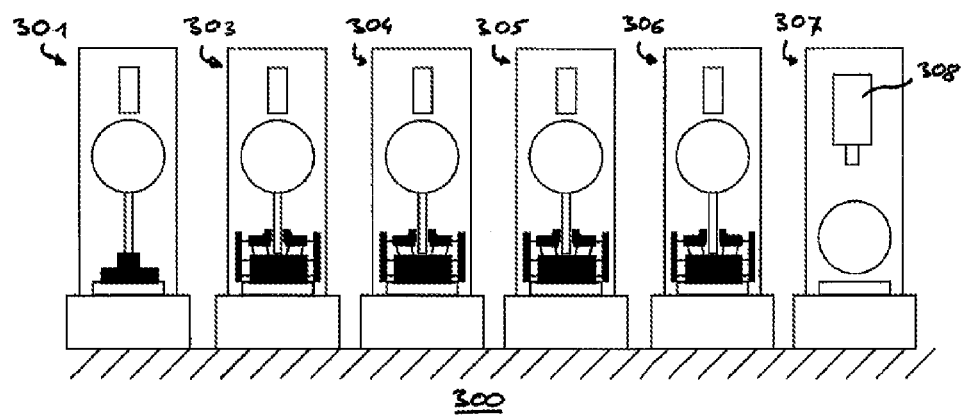
FIG. 5: a machine according to one embodiment of the present invention, having a plurality of work stations.

FIG. 5 shows a machine according to one embodiment of the present invention, having a plurality of work stations.

The machine has a base 300 that is solid with its surroundings, an upstream work station 301 for electrochemically or generatively producing a first rough contour of a blisk 51, two work stations 303, 304, connected in series after the latter work station, for ECM pre-machining, and two work stations 305, 306, connected in series after the latter, for PECM final machining of the blisk for electrochemically producing a second, or final, outer contour of the blisk 51, and, downstream from the latter work station, a work station 307, having a measuring means 308 for optical or tactile measurement of a blisk 51 released from a workpiece holder of the upstream work stations 301, 303-306.

The machine, in one embodiment, has a mobile or stationary crane (not represented) that has a lifting apparatus, for transporting the blisk out of one of the work stations 301, 303-307 or a buffer (not represented) and into another of the work stations 301, 303-307 or a buffer (not represented). In one embodiment, the machine additionally has one or more robots (not represented) for this purpose.

Figure 6:
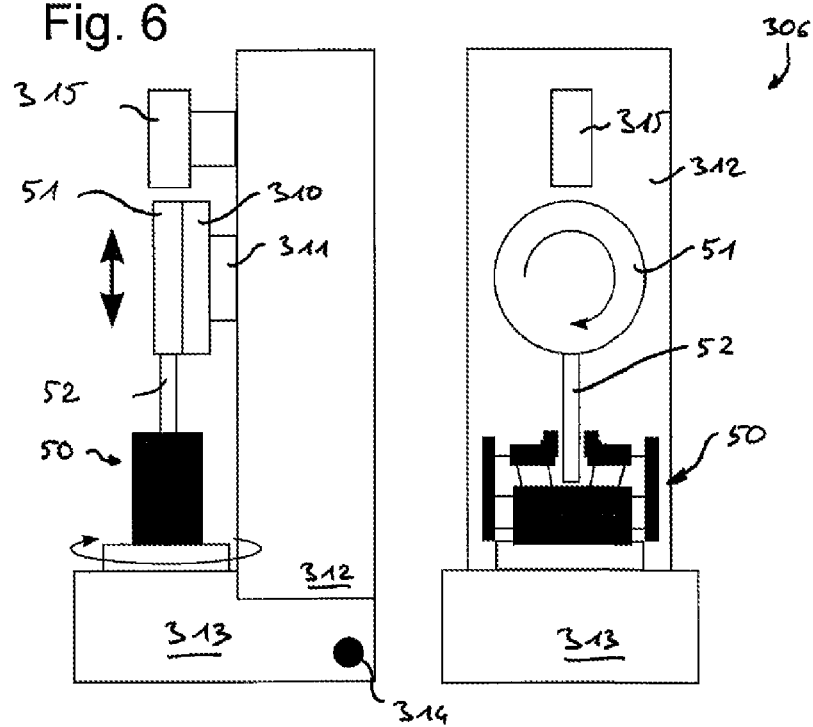
FIG. 6: a work station of the machine, in a side view (left in FIG. 6) and in a frontal view (right in FIG. 6)

FIG. 6 shows the work station 306 in a side view (left in FIG. 6) and a frontal view (right in FIG. 6). One or more of the work stations 303-305 may be of a similar design.

The work station 306 has a module 50 for electrochemically machining the blisk 51, in particular the blades 52 thereof, which module has been described in detail above with reference to FIG. 2 and is therefore represented only in schematic form here.

The work station 306 additionally has a workpiece holder for separably attaching the blisk 51, and a positioning device for displacing this workpiece and the module 50 relative to each other.

The workpiece holder has a chuck 310, in particular a zero-point attachment system, for separably attaching the blisk 51, that is separably connected to a workpiece flange 311. This workpiece flange 311, for its part, as indicated by a motion arrow on the right in FIG. 6, can be rotated about a workpiece rotation axis by an actuating drive (not represented) and, as indicated by a motion double arrow on the left in FIG. 6, is mounted on a part 312 of a main body so as to be linearly displaceable by a further actuating drive (not represented), vertically in a workpiece linear axis. The workpiece holder linear axis encloses an angle of 90° with the workpiece holder rotation axis.

In addition, as indicated by a motion arrow on the left in FIG. 6, the module 50 is mounted, on a part 313 of the main body that is solid with the base, so as to be rotatable about a module rotation axis by an actuating drive (not represented). In the operating position shown in FIG. 6, the module rotation axis and workpiece holder rotation axis enclose an angle of 90°.

The positioning device accordingly comprises, in particular, the part 312 of the main body, as well as the actuating drive for displacing the rotatably mounted workpiece holder 310, 311.

The work station 306 has a swivel bearing 314 for swiveling the part 312 of the main body and the workpiece holder 310, 311 mounted thereon relative to the part 313 of the main body that is solid with this base, and consequently also relative to the base 300, in particular into a vertical operating position, and into a horizontal position, in which the blisk, or the chuck, is more easily attached.

Figure 7:
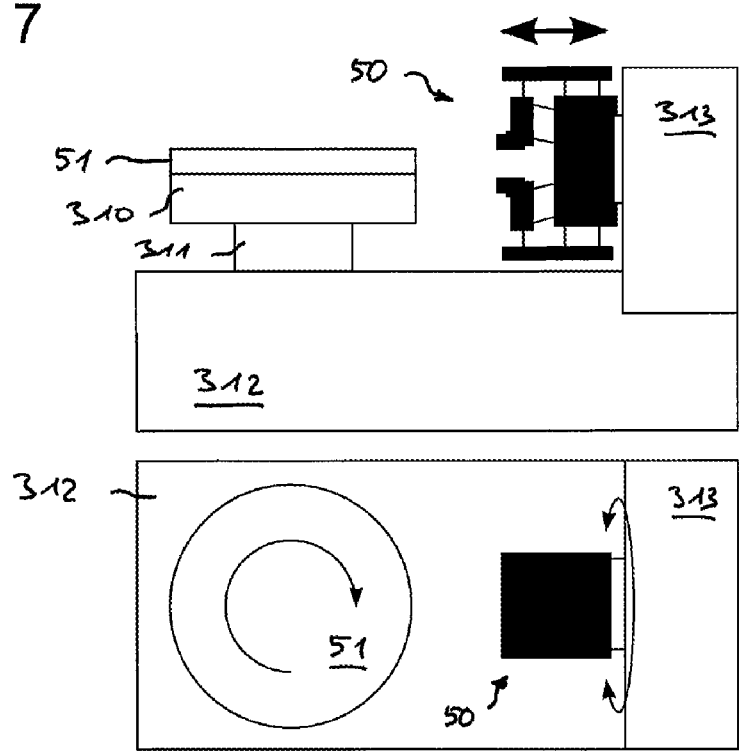
FIG. 7: a work station of a machine according to one embodiment of the present invention, in a side view (top in FIG. 7) and in a top view (bottom in FIG. 7)

FIG. 7 shows a work station of a machine according to a further embodiment of the present invention, in a side view (top in FIG. 7) and a top view (bottom in FIG. 7), that can be used, in particular, instead of the work station 306 described above with reference to FIG. 6 or instead of one of the work stations 303-305 in the machine of FIG. 5. Features that correspond to each other are identified by identical references, such that reference is made to the previous description, and the following deals only with differences.

In the embodiment of FIG. 7, the module 50, as indicated by a motion double arrow at the top in FIG. 7, is mounted, on the part 313 of the main body that is solid with the base, so as to be linearly displaceable by an actuating drive (not represented), horizontally in a module linear axis, which, in the embodiment of FIG. 7, is realized so as to be integral with the part 312 of the main body. In addition, as indicated by a motion double arrow at the bottom in FIG. 7, the module 50 is mounted on the part 313 of the main body so as to be rotatable about the module rotation axis by an actuating drive (not represented).

As indicated by a motion arrow at the bottom in FIG. 7, the workpiece holder flange 311 and the chuck 310, separably connected thereto, with the blisk 51 that is separably attached to the latter, are mounted on the part 312 of the main body so as to be rotatable about a workpiece holder rotation axis by an actuating drive (not represented).

Here, also, the module rotation axis and workpiece holder rotation axis enclose an angle of 90°. The module linear axis encloses an angle of 90° with the workpiece holder rotation axis.

Here, the positioning device accordingly comprises, in particular, the part 313 of the main body, as well as the actuating drive for displacing the rotatably mounted module 50.

In the embodiment of FIG. 6, the positioning device thus displaces the rotatably mounted workpiece holder 310, 311 vertically relative to the rotatably mounted and stationary module 50, whereas, in the embodiment of FIG. 7, it displaces the rotatably mounted module 50 horizontally relative to the rotatably mounted and stationary workpiece holder 310, 311, on the basic body 312, 313.

In addition or as an alternative to the measuring means 308 of the downstream work station 307, one or more of the work stations 301, 303-306 has, or have, an optical or tactile measuring means 315 for measuring the blisk 51 in situ. Like the measuring means 308, the measuring means 315 may be movably mounted on the respective work station 307 or 306.

Figure 8:
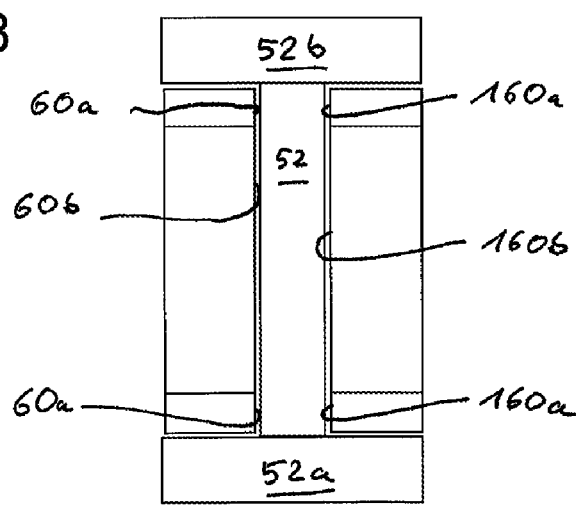
FIG. 8: a part of a module according to one embodiment of the present invention.

FIG. 8 shows a modification of the module 50, described in detail above with reference to FIG. 2, according to one embodiment of the present invention. In this case, FIG. 8 shows only a part of the module 50, insofar as this is relevant for explaining the modification. Features that correspond to each other are identified by identical references, such that reference is made to the previous description, and the following deals only with differences.

The two electrodes 60 and 160 realized in a mirror-symmetrical manner (cf. also FIG. 2) each have first surface working regions 60a and 160a, respectively, and second surface working regions 60b and 160b, respectively, that differ therefrom. In the exemplary embodiment, the first surface working regions 60a, 160a are edge regions of the electrode 60 and 160, respectively, the second surface working regions 60b, 160b being areal regions of the electrode 60 and 160, respectively.

Optionally, in particular consecutively, in a first operating mode of the module 50, voltage is applied only to the first surface working regions 60a and/or 160a, for the purpose of electrochemically machining the workpiece, and in a second operating mode additionally to the second surface working regions 60b and 160b. In particular, this enables undercuts to be machined in a simple and/or precise manner on inner and outer shrouds 52a, 52b of the blades 52.

Figure 9:
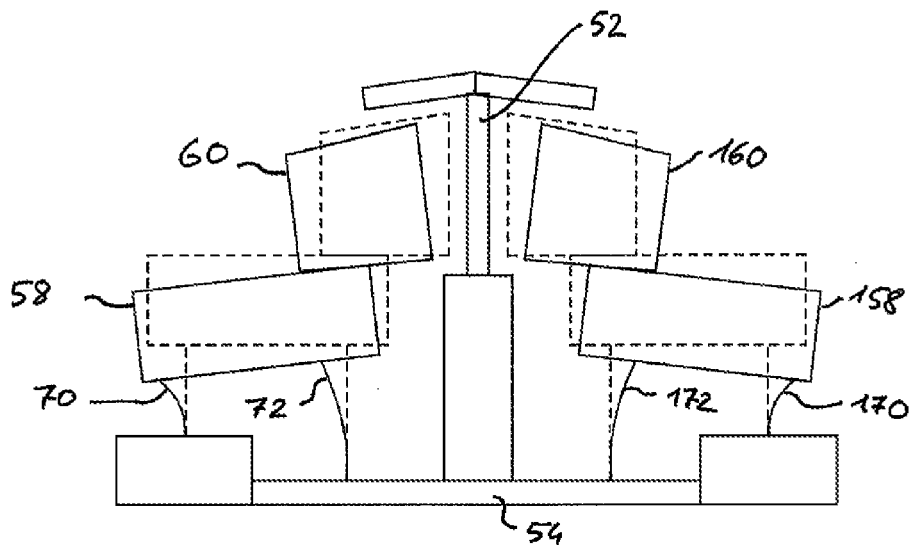
FIG. 9: a part of a module according to one embodiment of the present invention.

FIG. 9 shows a modification of the module 50, described in detail above with reference to FIGS. 2 and 8, according to one embodiment of the present invention. In this case, FIG. 9 again shows only a part of the module 50, insofar as this is relevant for explaining the modification. Features that correspond to each other are identified by identical references, such that reference is made to the previous description, and the following deals only with differences.

In the embodiment of FIG. 9, the two swivel arms 70, 72 and 170, 172, via which the tool holders 58 and 158, respectively, are mechanically connected to the frame 54 (cf. FIG. 2) each have different lengths. As a result of this, the tool holders moved by the drives 56, 156 execute, in addition to the oscillatory motion, a tilting motion relative to the frame, as against an initial position, indicated by broken lines in FIG. 9, in which the two swivel arms 70, 72 and 170, 172 are undeformed. As can be seen from FIG. 9, this also enables undercuts to be machined on shrouds of the blades 52.

FIG. 10 shows, again partially in schematic form, a drive of a module 1 or 50, already described above, according to one embodiment of the present invention, in the form of an eccentric torque motor.

Figure 10:
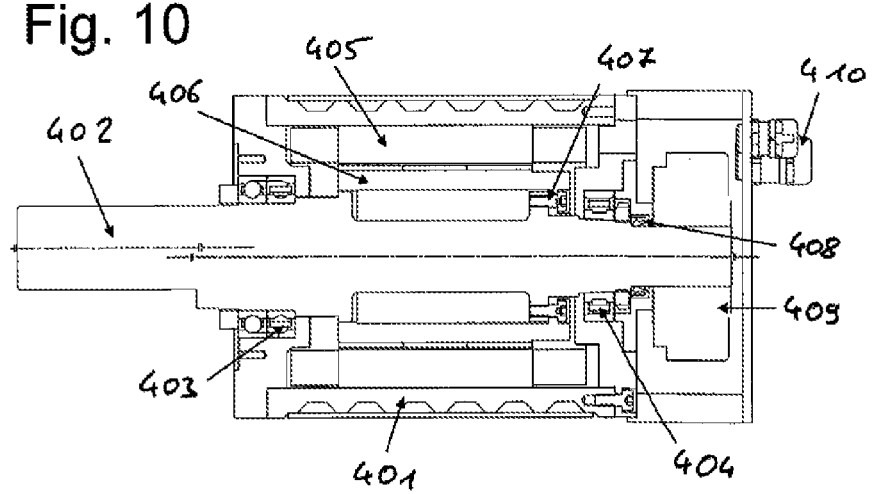
FIG. 10: a drive of a module according to one embodiment of the present invention.

The latter has a water cooling system 401. An output shaft is realized as an eccentric shaft 402, having the drive axle 14 (cf. FIG. 1) or 64 or 164 (cf. FIG. 2) and the swivel axle 16 (cf. FIG. 1) or 66 or 166 (cf. FIG. 2). The eccentric shaft is rotatably mounted in fixed ceramic bearings 403 on the output side (left in FIG. 10), and in a loose ceramic bearing 404 on the side that faces away from the output side (right in FIG. 10), The eccentric shaft 402 is screw-connected, by means of screws 407, to a rotor 406 that is subjected to magnetic action by a stator 405 of the motor. In addition, FIG. 10 shows a seal 408 of the eccentric shaft, a rotary encoder 409 and an electric power supply 410.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCES NUMBERS

1 ECM module
2 workpiece
4 frame
6 drive
8 tool holder
10 tool (electrode)
12 disk
14 drive axle
16 swivel axle
18 drive arm
20 first swivel arm
22 second swivel arm
24 first hinged joint
26 second hinged joint
28 third hinged joint
30 fourth hinged joint
32 fifth hinged joint
40 blade
42 blade disk
44 blade interspace
46 fourth blade interspace
48 rotation axis
50 ECM module
52 blade
54 frame
56/156 first drive/second drive
58/158 first tool holder/second tool holder
60/160 first tool/second tool
62/162 first disk/second disk
64/164 first drive axle/second drive axle
66/166 first swivel axle/second swivel axle
68/168 first drive arm/second drive arm
69/169 first rocker/second rocker
70/170 first swivel arm/second swivel arm
72/172 first swivel arm/second swivel arm
80/180 first thrust arm/second thrust arm
82/182 first bearing arm/second bearing arm
200 sinusoidal electrode characteristic
201 square-wave voltage
205 pulsed voltage
206 square-wave voltage
210 second embodiment trapezoidal position characteristic
220 first embodiment trapezoidal position characteristic
230 angle curve
51 blisk
52a inner shroud
52b outer shroud
60; 160a edge region (first surface working region)
60b; 160b areal region (second surface working region)
300 base
301; 303-307 work station
308, 315 measuring means
310 chuck (tool holder)
311 tool holder flange (tool holder)
312, 313 main body part
314 swivel bearing
401 water cooling system
402 eccentric shaft
403 fixed ceramic bearing
404 loose ceramic bearing
405 stator
406 rotor
407 screw
408 seal
409 rotary encoder
410 electric power supply

What is claimed is:

1. A machine comprising a base and at least one work station which comprises a module for electrochemically machining a workpiece, wherein the module comprises:
    a frame; and
    an electrode arrangement comprising
        at least one electrode which is mechanically connected to the frame, and a drive for moving the at least one electrode, which drive is attached to the frame;
        a workpiece holder for separably attaching the workpiece; and
        a positioning device for displacing the workpiece holder and the module relative to each other,
    and wherein
    the drive comprises a drive axle at a distance from which a swivel axle is arranged, a drive arm being hinge-coupled to the swivel axle; and
    an eccentric shaft is arranged on the drive axle or is integral with an output shaft of the drive, a second axle of the eccentric shaft representing the swivel axel.

2. The machine of claim 1, wherein the positioning device comprises a main body on which the workpiece holder and/or the module are/is mounted so as to be linearly displaceable.

3. The machine of claim 2, wherein the workpiece holder comprises a chuck for separably attaching the workpiece, which chuck is separably connected to the main body.

4. The machine of claim 1, wherein the positioning device comprises a robot comprising at least two actuated revolute joints for displacing the workpiece holder relative to the module.

5. The machine of claim 1, wherein the positioning device comprises a crane having a lifting device and/or a robot having at least two actuated revolute joints for transferring the workpiece out of a further work station and/or a buffer and/or into a further work station and/or a further buffer of the machine.

6. The machine of claim 1, wherein the machine further comprises a swivel bearing for swiveling the workpiece holder relative to the base.

7. The machine of claim 1, wherein the machine further comprises a measuring device for measurement of the workpiece.

8. The machine of claim 7, wherein the measuring device is for optical and/or tactile measurement of the workpiece.

9. The machine of claim 1, wherein the machine further comprises an upstream further work station for producing a first outer contour of the workpiece which, as compared to a second outer contour of the workpiece after machining in a downstream work station, has a machining allowance.

10. The machine of claim 1, wherein the at least one electrode has a first surface working region and a second surface working region and the module has a first operating mode, in which voltage is applied only to a first surface working region for electrochemically machining the workpiece, and a second operating mode, in which voltage is additionally or alternatively applied to the second surface working region for electrochemically machining the workpiece.

11. The machine of claim 10, wherein the electrode is mechanically connected to the frame via a tool holder which is mechanically connected to the frame via two swivel arms of differing lengths.

12. The machine of claim 10, wherein the drive comprises a water cooling system.

13. The machine of claim 10, wherein the drive comprises an electric motor, the output shaft of which is embodied as an eccentric shaft, having a drive axle and a swivel axle that is offset parallelwise, and is rotatably mounted in at least one ceramic bearing and/or screw-connected to a rotor that is acted upon magnetically.

14. The machine of claim 10, wherein the positioning device comprises a crane having a lifting device and/or a robot having at least two actuated revolute joints for transferring the workpiece out of a further work station and/or a buffer and/or into a further work station and/or a further buffer of the machine.

15. A method for electrochemically machining a workpiece by the machine of claim 1, wherein the method comprises:
separably attaching the workpiece to the workpiece holder; and
displacing the workpiece holder and/or the module relative to each other.

16. A module for electrochemically machining a workpiece, wherein the module comprises:
a frame; and
an electrode arrangement comprising
at least one electrode which has a first surface working region and a second surface working region and which is mechanically connected to the frame, and a drive for moving the at least one electrode, which drive is attached to the frame;
the module having a first operating mode, in which voltage is applied only to the first surface working region for electrochemically machining the workpiece, and a second operating mode, in which voltage is additionally or alternatively applied to the second surface working region for electrochemically machining the workpiece.

17. A method for electrochemically machining a workpiece by the module of claim 16, wherein the method comprises, in a first operating mode of the module, applying voltage only to the first surface working region for electrochemically machining the workpiece, and, in a second operating mode of the module, applying voltage additionally or alternatively to the second surface working region for electrochemically machining the workpiece.

18. The module of claim 16, wherein the electrode is mechanically connected to the frame via a tool holder which is mechanically connected to the frame via two swivel arms of differing lengths.

19. The module of claim 16, wherein the drive comprises a water cooling system.

20. The module of claim 16, wherein the drive comprises an electric motor, the output shaft of which is embodied as an eccentric shaft, having a drive axle and a swivel axle that is offset parallelwise, and is rotatably mounted in at least one ceramic bearing and/or screw-connected to a rotor that is acted upon magnetically.

* * * * *